(12) United States Patent
Duehl et al.

(10) Patent No.: US 8,276,314 B2
(45) Date of Patent: Oct. 2, 2012

(54) TERRESTRIAL ARTHROPOD TRAP

(75) Inventors: Adrian J. Duehl, Gainesville, FL (US); Lee W. Cohnstaedt, Corvallis, OR (US); Richard T. Arbogast, Gainesville, FL (US); Peter E. A. Teal, Gainesville, FL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 12/790,342

(22) Filed: May 28, 2010

(65) Prior Publication Data

US 2011/0289822 A1    Dec. 1, 2011

(51) Int. Cl.
  *A01M 1/04*    (2006.01)
  *A01M 1/10*    (2006.01)
(52) U.S. Cl. .................. 43/113; 43/121; 43/107
(58) Field of Classification Search .......... 43/113, 43/121, 122, 107
  See application file for complete search history.

(56) References Cited

U.S. PATENT DOCUMENTS

| | | | | |
|---|---|---|---|---|
| 109,282 | A | * | 11/1870 | Williams ............... 43/121 |
| 379,581 | A | * | 3/1888 | Kell ..................... 43/121 |
| 400,460 | A | * | 4/1889 | Jennings ............... 43/121 |
| 1,882,380 | A | * | 10/1932 | Braun .................. 43/107 |
| 2,345,408 | A | * | 3/1944 | Martin ................. 43/107 |
| 2,435,317 | A | * | 2/1948 | McGrew ............... 43/121 |
| 2,997,806 | A | * | 8/1961 | Duvall ................. 43/121 |
| 3,885,341 | A | * | 5/1975 | Kuchenbecker et al. ....... 43/121 |
| 4,227,333 | A | * | 10/1980 | Levinson et al. ........... 43/121 |
| D258,751 | S | * | 3/1981 | Lindley ............... D22/122 |
| 4,263,740 | A | * | 4/1981 | Hemsarth et al. ......... 43/121 |
| 4,423,564 | A | * | 1/1984 | Davies et al. .......... 43/121 |
| 4,581,845 | A | * | 4/1986 | Burkholder et al. ...... 43/121 |
| 4,608,774 | A | * | 9/1986 | Sherman ............... 43/121 |
| 4,638,592 | A | * | 1/1987 | Schneidmiller ........ 43/122 |
| 4,761,912 | A | * | 8/1988 | Dyer et al. ............ 43/121 |
| 4,837,969 | A | * | 6/1989 | Demarest ............. 43/131 |
| 4,866,877 | A | * | 9/1989 | Barak ................. 43/121 |
| 4,914,854 | A | * | 4/1990 | Zhou et al. ........... 43/112 |
| 4,927,635 | A | * | 5/1990 | Loschiavo ............ 424/409 |
| 5,005,416 | A | * | 4/1991 | Vick et al. ........... 43/121 |
| D323,014 | S | * | 1/1992 | Demarest et al. ....... D22/122 |
| 5,090,153 | A | * | 2/1992 | Mullen et al. ......... 43/121 |
| 5,133,150 | A | * | 7/1992 | Briese ................ 43/122 |
| 5,253,450 | A | * | 10/1993 | Muramatsu ........... 43/121 |

(Continued)

FOREIGN PATENT DOCUMENTS

JP          03091431 A   *   4/1991

*Primary Examiner* — Darren W Ark
(74) *Attorney, Agent, or Firm* — John Fado; Robert D. Jones; Lesley Shaw

(57) ABSTRACT

The arthropod trap has a base with a plurality of sides that angle upwardly and inwardly toward a capture area in the center of the base. Multiple outwardly-projecting fins are disposed on or adjacent to the sides of the base. The fins also angle upwardly toward the capture area so that the fins guide arthropods into the capture area. The capture area includes a pitfall so that the arthropods topple through a pitfall opening and are retained in the pitfall. A trap cover fits over and at least partially conceals the capture area. In one embodiment, the trap cover provides a platform for the placement of light emitting diodes that emit light in a wavelength that appeals to the positive phototaxis instincts of the target arthropods.

11 Claims, 9 Drawing Sheets

U.S. PATENT DOCUMENTS

| | | | |
|---|---|---|---|
| 5,259,153 A * | 11/1993 | Olive et al. | 43/113 |
| 5,301,456 A * | 4/1994 | Jobin et al. | 43/113 |
| 5,771,628 A * | 6/1998 | Nobbs | 43/121 |
| 5,802,761 A * | 9/1998 | Demarest et al. | 43/121 |
| 5,896,695 A * | 4/1999 | Walker | 43/113 |
| 5,983,558 A * | 11/1999 | Las et al. | 43/131 |
| 6,216,384 B1 * | 4/2001 | Dickson et al. | 43/131 |
| 6,279,261 B1 * | 8/2001 | Binker et al. | 43/125 |
| 6,430,868 B1 * | 8/2002 | Plato et al. | 43/121 |
| 6,594,947 B2 * | 7/2003 | Lingren et al. | 43/114 |
| 6,772,556 B1 * | 8/2004 | Liu | 43/121 |
| 6,910,298 B2 * | 6/2005 | Schneidmiller | 43/65 |
| 6,920,716 B2 * | 7/2005 | Kollars et al. | 43/107 |
| 6,958,360 B2 * | 10/2005 | Dickens et al. | 514/675 |
| 7,043,873 B2 * | 5/2006 | Westphal et al. | 43/131 |
| 7,204,054 B2 * | 4/2007 | Mayo et al. | 43/131 |
| 7,299,587 B1 * | 11/2007 | Metcalfe | 43/121 |
| 7,343,710 B2 * | 3/2008 | Metcalfe | 43/121 |
| 7,669,362 B2 * | 3/2010 | Cwiklinski et al. | 43/107 |
| 7,784,215 B2 * | 8/2010 | Cohnstaedt et al. | 43/113 |
| 7,892,528 B2 * | 2/2011 | Siljander et al. | 424/84 |
| 2005/0091911 A1 * | 5/2005 | Matts et al. | 43/131 |
| 2005/0279016 A1 * | 12/2005 | Williams et al. | 43/122 |
| 2006/0218851 A1 * | 10/2006 | Weiss et al. | 43/113 |
| 2007/0044372 A1 * | 3/2007 | Lang et al. | 43/114 |
| 2007/0056208 A1 * | 3/2007 | Chen et al. | 43/113 |
| 2008/0022583 A1 * | 1/2008 | Kurashima et al. | 43/121 |
| 2009/0145019 A1 * | 6/2009 | Nolen et al. | 43/121 |
| 2009/0145020 A1 * | 6/2009 | McKnight | 43/121 |
| 2009/0282728 A1 * | 11/2009 | Mcknight et al. | 43/107 |
| 2010/0024278 A1 * | 2/2010 | Simchoni-Barak et al. | 43/113 |
| 2010/0139151 A1 * | 6/2010 | Cwiklinski et al. | 43/107 |
| 2011/0047860 A1 * | 3/2011 | Black et al. | 43/121 |
| 2011/0099886 A1 * | 5/2011 | Siljander et al. | 43/121 |
| 2011/0252693 A1 * | 10/2011 | Hui | 43/121 |

* cited by examiner

TERRESTRIAL ARTHROPOD TRAP

FIELD OF THE INVENTION

The present invention relates to a trap for terrestrial arthropods. Specifically, the invention relates to a trap for arthropods whose primary mode of locomotion is along the ground. The current invention combines visual, tactile and olfactory cues to take advantage of arthropod behavioral traits.

BACKGROUND OF THE INVENTION

Terrestrial arthropod sampling is largely dependent on passive pitfall-type traps and the physical collection of arthropods within a selected ground cover (i.e. leaf litter, moss, etc.). However, most current pitfall traps do not employ a visual means to attract arthropods or a physical construction that directs their movement, and consequently the effectiveness of current sampling traps is limited. Similarly, the physical collection of arthropods within ground cover is destructive, time consuming, and generally inefficient.

One example of a terrestrial arthropod frequently collected through the sampling process is the flour beetle Tribolium (particularly the species castaneum and confusum). Flour beetles are most problematic in flour mills, where they can feed and multiply in large numbers. Trapping the beetles is difficult because flour mill storage areas are generally well-ventilated and food source odors dilute conventional pheromone attractants. Frequently the flour beetles are not drawn close enough to a trap for an olfactory or pheromone lure to be effective. Current traps do not take full advantage of visual devices and strategies that will lure the beetles from greater distances.

The need exists for a visual lure to attract arthropods close enough to a trap for olfactory or pheromone lures to be effective. Once the arthropods are close enough for a lure to be effective, there is a further need for a trap designed specifically to appeal to the tactile and behavioral traits of the targeted arthropod.

The current invention comprises a pyramidal trap that is easily produced in selected colors to appeal to targeted arthropods' visual instincts. Further, the trap can be configured to include a light emitting diode (LED) light system capable of drawing the arthropods in from an extended distance. Once the arthropods are close to the trap, the features of the trap are designed to take full advantage of the arthropods' natural tendencies and thereby draw the arthropods into a capture area in the base portion of the trap. The trap may also include conventional pheromone lures or other attractant features.

SUMMARY OF THE INVENTION

The current invention is directed to an arthropod trap. The trap comprises a hollow base with a plurality of sides. The sides are angled upwardly toward a capture area in the center of the base. At least one outwardly projecting fm is disposed on or adjacent to the sides of the base. The fm angles upwardly toward the capture area so that a target arthropod follows the fm up the sides and into the capture area. A cover fits over and at least partially conceals the capture area.

The current invention is also directed to a method of trapping arthropods. In accordance with the method, a base with a plurality of sides is provided. Each of the sides is angled upwardly and inwardly toward a capture area. Multiple fins are positioned on the sides of the base so that the fins angle upwardly toward the capture area. In operation, arthropods follow the fins up the side of the base and into the capture area.

The current invention is further directed to an arthropod trap comprising at least one ramp which angles upwardly. At least one fm is positioned on or adjacent to the ramp. A capture area is disposed adjacent to an uppermost portion of the ramp and the fm. In operation, an arthropod is guided up the ramp by the fm and into the capture area.

DETAILED DESCRIPTION OF PREFERRED EMBODIMENTS

Figure 1:
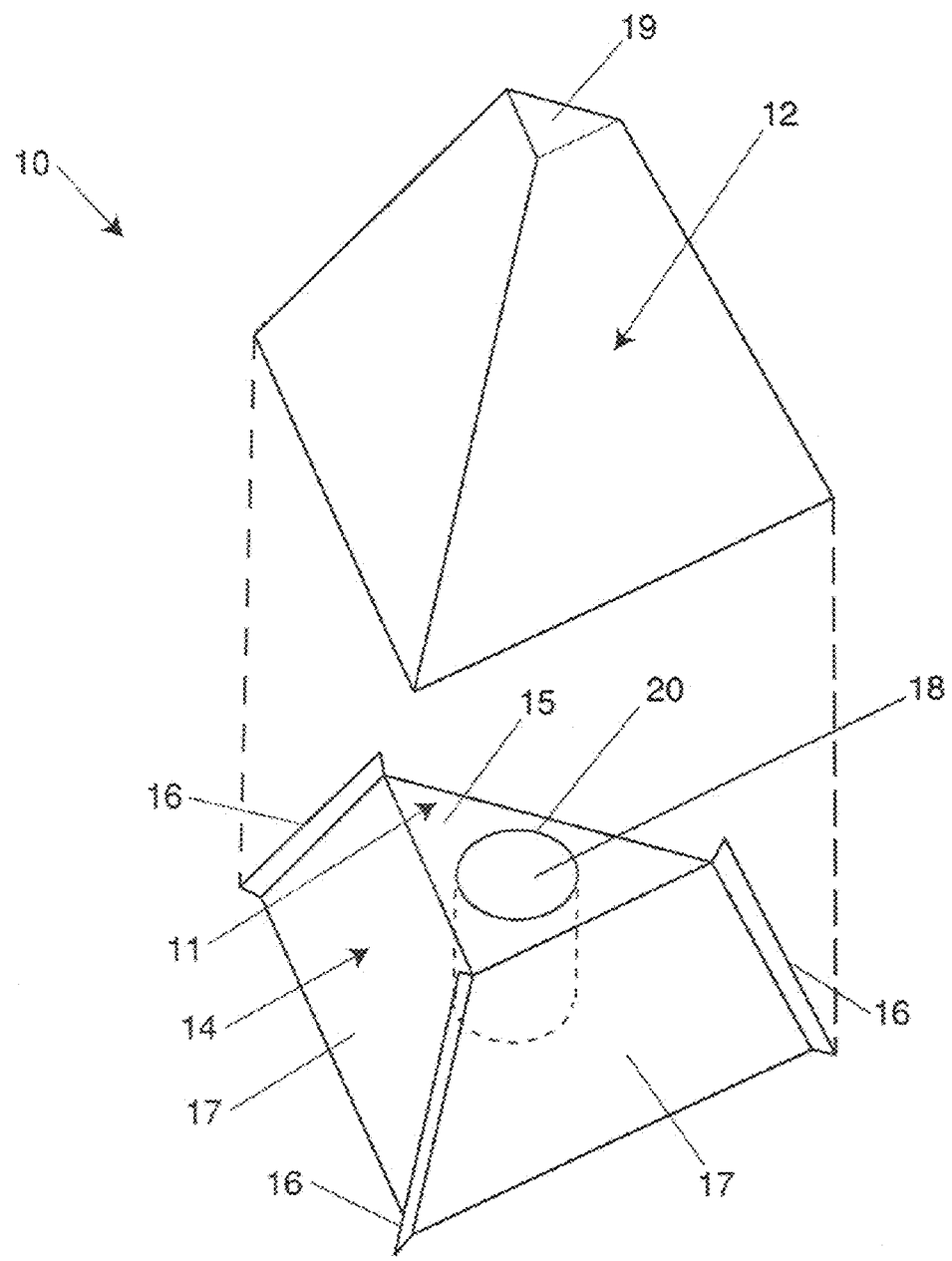
FIG. 1 is a partial assembly view of the arthropod trap of the current invention.

The present invention is an arthropod trapping system primarily directed to terrestrial arthropods that move along the ground. As generally shown in FIG. 1, the terrestrial arthropod trapping system 10 (i.e. "the trap") is a simple construction that can easily be produced in a variety of colors, textures, and patterns that appeal to a targeted arthropod's positive photo-, chemo-, and thigmotaxic instincts. In the preferred embodiment, the arthropod trapping system 10 comprises a polygonal cover 12 that engages a corresponding polygonal base 14. Both the cover 12 and the base 14 of the preferred embodiment have the general shape of a truncated triangular pyramid (i.e. a regular tetrahedron with a truncated apex).

In the preferred embodiment, the trap's base 14 is designed so that outwardly projecting fins 16 extend from the edges of the sides 17 of the base 14. The inclined sides 17 of the base 14 comprise ramps that appeal to the arthropods' innate tendency to climb. The sides 17 may also be textured to further appeal to the arthropods' climbing instinct. The placement of the fins 16 also appeals to the arthropods' instinct to follow a projecting surface in search of food accumulated in crevices associated with the projection. As the arthropods climb the sides 17, the fins 16 extending from the trap's edges guide the arthropods onto the truncated portion of the base 14 which corresponds with a capture area 11.

In the preferred embodiment; the capture area 11 comprises a platform 15 which includes a pitfall 18 and an associated pitfall opening 20. The pitfall 18 may hold an olfactory lure or other attractant to draw arthropods into the capture area 11, through the capture opening 20, and into the pitfall 18. The upper edges of the opening 20 may be rounded, or the platform 15 may be angled inwardly, toward the capture area 11 so that the arthropods do not clearly sense the capture area opening 20 until they topple-into the pitfall 18.

In the preferred embodiment, the elements of the capture area 11 (i.e. the platform 15 and pitfall 18) may be formed as a single piece of molded plastic so that the generally horizontal surface of the platform 15 slopes and bends into the pitfall 18. In alternative embodiments, the platform 15 may be comprised of cardboard and the pitfall 18 and associated opening 20 may be a plastic insert. In further alternative embodiments, the platform 15 and capture area 18 may be comprised of any material known in the art consistent with the function described herein.

In an alternative embodiment, the base 14 has a planar floor that is contiguous with and attached to the bottom portion of the base's sides 17. In this embodiment, an upper edge of the sides 17 is rounded or angled to form a lip-type edge. As described supra (with reference to the preferred embodiment of the capture area 11), the arthropods do not clearly sense an edge (i.e. lip) until they topple into the pitfall 18. In this alternative embodiment, the entire interior of the hollow base 14 comprises the pitfall 18. In a further alternative embodiment, the pitfall 18 has a sticky bottom surface (floor) to reduce the possibility of arthropod escape.

Figure 2:
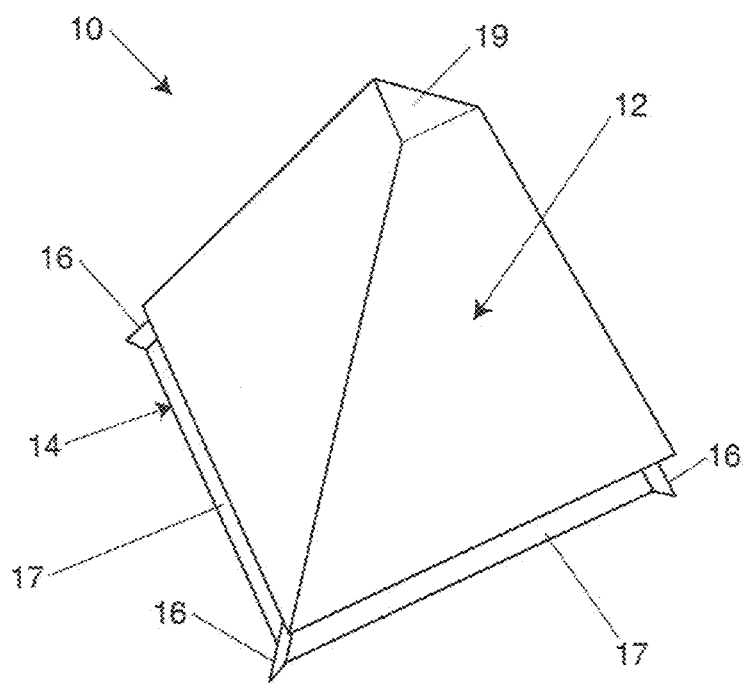
FIG. 2 is a perspective view of the trap in its assembled configuration.
Figure 3:
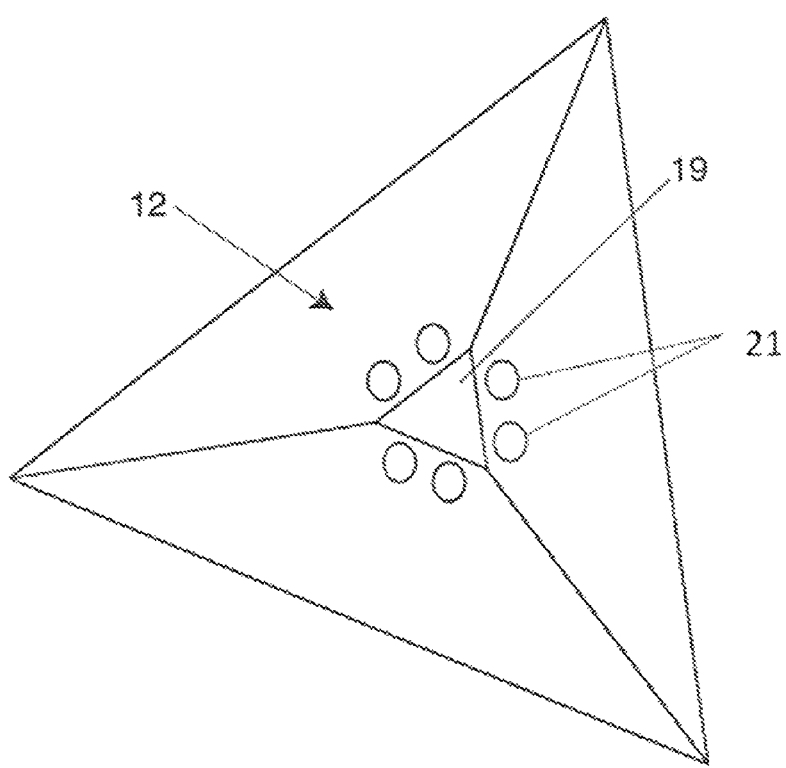
FIG. 3 is a top view of the trap cover with LEDs installed.
Figure 4:
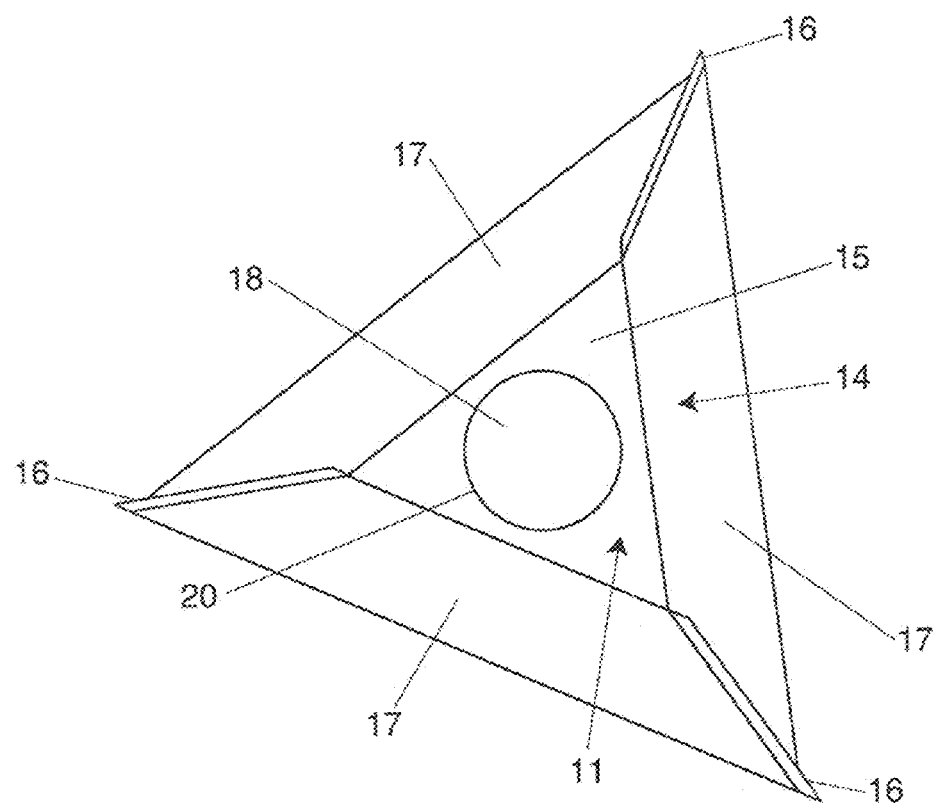
FIG. 4 is a top view of the trap base.

As shown in FIG. 2, the fins 16 support the cover 12. The cover 12 generally prevents airborne particles and/or debris from filling the pitfall 18 and creates a dark and sheltering environment within the trap 10. The cover 12 also provides support for LEDs 21 and other visual lures intended to appeal to the arthropods' positive phototaxis instincts and thereby draw arthropods from a greater distance than a conventional pheromone lure alone. As best shown in FIG. 3, in the preferred embodiment, a plurality of LEDs 21 may be disposed proximate an upper portion of the cover 12.

In the preferred embodiment, the truncated apex portion 19 of the cover 12 is closed. However, in alternative embodiments the apex 19 may comprise an opening so that the scent of the pheromone lure or other attractant emanates from the apex. In further alternative embodiments, a container (not shown) holding additional attractant material may be positioned adjacent the open apex 19.

Once the arthropods are in the general area of the trap 10, the inventors have found that a relatively narrow gap between the cover 12 and the base 14 naturally draws arthropods into the gap. The arthropods are drawn into the gap in response to the arthropods' negative phototaxis instincts. Arthropods naturally seek relatively dark and sheltering spaces (like the interior of the trap 10) which provide concealment and minimize predator access. Further, if a pheromone or other attractant is positioned in the pitfall 18, the attractant generally emanates from the pitfall and out of the trap 10 through the gap, which also draws arthropods into the gap. In the preferred embodiment, the vertical height of the gap is approximately equal to the vertical height of the target arthropods. In alternative embodiments, the gap may be greater than the vertical height of the arthropod.

Experimental Investigation

As shown in FIG. 3, in at least one embodiment, LED lights 18 are disposed adjacent an upper portion of the trap cover 12.

As briefly discussed supra, arthropods can be drawn to a trap over extended distances by appealing to the arthropod's positive phototaxis instincts. Specifically, flour beetles have highly conserved visual pigments with maximal absorption of between 350 and 550 nm, which allows for vision in the ultra violet range of the electromagnetic spectrum.

For example, based on visual cues and behavioral tendencies, bees are more attracted to flowers reflecting near UV light, whereas beetles are more likely to pollinate red flowers. The evolutionary history and physiological needs of individual species determines the wavelengths that are attractive or repellant. Narrow wavelengths of light, tuned to phototaxis of specific arthropod species have been shown to attract the target species and thereby increase the effectiveness of traps incorporating the lights.

Light-based traps are currently used to catch Diptera and other nocturnal flying arthropods in flour mills. However, these traps use broad spectrum fluorescent bulbs and consequently are bulky and must be attached to a permanent power source. LEDs use less energy and may be selected to produce narrow spectral bands of light. The solid state physics of LEDs allows light traps to be deployed in harsh and varied environments for population monitoring and control. Adding LEDs to traps (such as the trap 10 described supra) designed for crawling arthropods may attract arthropods from greater distances.

Flour is an ideal habitat for red flour beetles and, as such, its spectral reflectance peaks at wavelengths slightly shorter than 400 nm. As discussed in detail infra, the inventors have found that the 390 nm wavelength is particularly attractive to red flour beetles. Combining the arthropod trap of the current invention with LEDs specifically designed to attract (for example) red flour beetles significantly increases the effectiveness of the trapping system.

Experimental Method

The inventors conducted four series of experiments. The first series of experiments tested the attraction of red flour beetles to single color LEDs. The second series tested trap designs to determine optimal placement of the LEDs. The third series examined the increase in trap efficiency when LEDs were combined with a chemical attractant. The fourth series compared the trap of the current invention (as described supra) with a trap considered the industry standard.

The tests were conducted in an arena comprised of conventional construction flashing material. The flashing material was cut into one inch strips and then bent into half circles so that each half circle has a diameter of 15.24 cm. An LED was attached to a midpoint between the ends of each half circle. The edges of adjacent half circles were then connected so that the connected half circles formed an arena with a "cloverleaf" (without a stem) shape. The inside of the arena was coated with matte black spray paint to prevent any light reflection across the arena.

An infrared light source and infrared camera were set up above the arena to record the beetle's movement so that if the beetles were attracted to light wavelengths outside the visible spectrum, their responses would be properly recorded. LED intensity was calibrated so each LED emitted 10 mW/cm$^2$.

First Experimental Series

In the first series of experiments, red flour beetles were tested for a response to LEDs emitting light in the UV and visual light ranges. In each trial, 10 Tribolium were released into the center of the arena and their movements were recorded for five minutes.

The number of beetle visits to the respective LED lights was recorded. This insured that all recorded attractions were individuals moving from the center to the side of the arena as opposed to simply following the edges of the arena. Each individual was able to visit an LED more than one time. The red flour beetles tested in this experiment were taken directly from lab cultures at 1-2 wk post eclosion.

The LEDs used in the first trial were blue (410 nm), near UV (390 nm) and UV (380 nm and 360 nm). After the beetles were released in the center of the arena, more beetles were attracted to the LEDs in the near UV range (390 nm) than any of the other LEDs.

Figure 5:
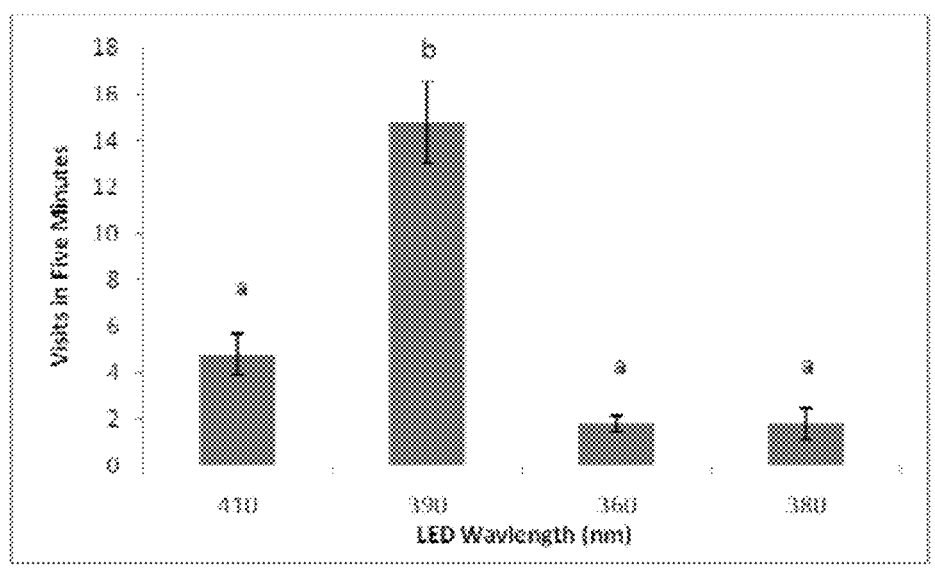
FIG. 5 shows the number of responses of 10 red flour beetles to LEDs emitting selected light wavelengths over five minutes (n=10). Error bars denote standard error.
Figure 6:
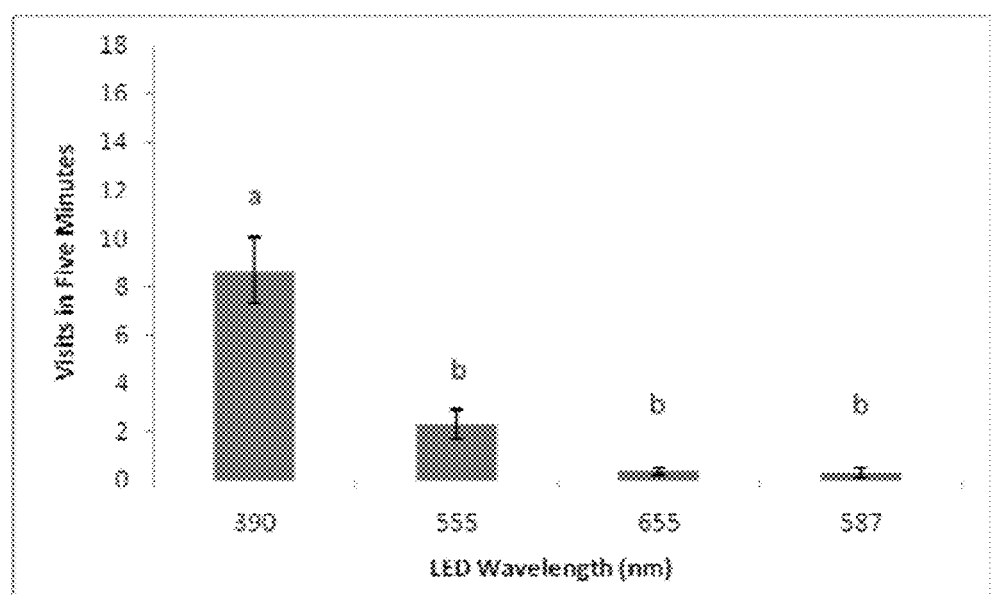
FIG. 6 shows the number of responses of 10 red flour beetles to LEDs emitting an expanded array of selected light wavelengths over five minutes (n=10). Error bars denote standard error.

The near UV lights were then compared to LEDs emitting light from other portions of the light spectrum. Specifically, in the second trial, the LEDs were near UV (390 nm), red (655 nm), green (555 nm), and yellow (587 nm). The results of the first experimental series are shown in FIGS. 5 and 6.

Second Experimental Series

In the second series of experiments, traps with LEDs on the bottom, on the top, and with no LEDs were tested competitively. The experiments were conducted in a shed approximately 9 meters long and 3 meters wide. All visible cracks in the floor and walls as well as areas around the door were sealed to ensure that no light other than the LEDs was present.

For each trial in the second series of experiments, 300 unsexed red flour beetles between one and two months old were released into the shed. Each trial lasted 24 hours. Between trials the shed was vacuumed to remove remaining individuals. The traps used in the trials were conventional dome-type insect traps that are currently available on the market. The LEDs were placed either at the top or the bottom of each trap. The "control" trap design exhibited no LEDs.

Figure 7:
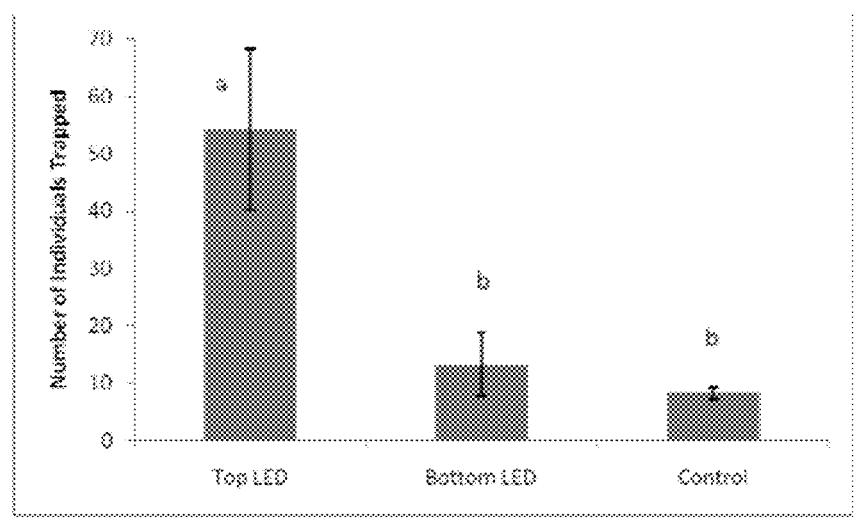
FIG. 7 shows the number of red flour beetles caught in dome traps either with LEDs at the top, bottom or without LEDs. Three hundred individuals were released and then trapping occurred over a 24 hour period (n=6). The trap with LEDs at the top was the most effective at trapping red flour beetles. Error bars denote standard error.

The LEDs were rated at 390 nm with a band width of 385-395 nm. The optical power of the LEDs was 10 mcd per LED. A 6 volt battery was used to power the LEDs. The traps were placed along the longitudinal axis of the shed. The traps were evenly spaced from each other and the end walls of the shed. The results of the second experimental series are shown in FIG. 7.

Third Experimental Series

Figure 8:
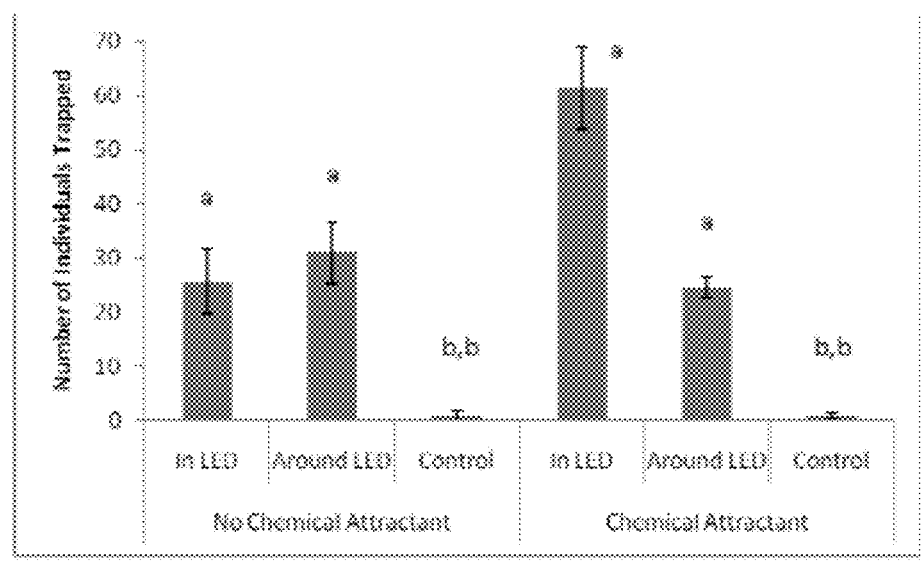
FIG. 8 shows competitive trapping by top mounted LED compared to a standard dome trap both with and without the Trécé chemical attractant. Each experiment (with and without chemical attractant) consisted of releasing 300 individuals and recapturing some over a 24 hour period (n=6), "Around LED" indicates beetles that were within 0.5 m of the trap. Error bars denote standard error.

In the third series of experiments, traps were configured with a 390 nm LED placed at the top of the trap. Some of the traps included a chemical attractant and some of the traps did not. As in the second series, the traps were placed along the longitudinal axis of the shed and evenly spaced from each other and from the walls. Data collected included both beetles captured in the respective trap pitfalls (i.e. "In LED") and also beetles collected within 0.5 m of the trap (i.e. "Around LED"). The results of the third series are shown in FIG. 8.

Fourth Experimental Series

Figure 9:
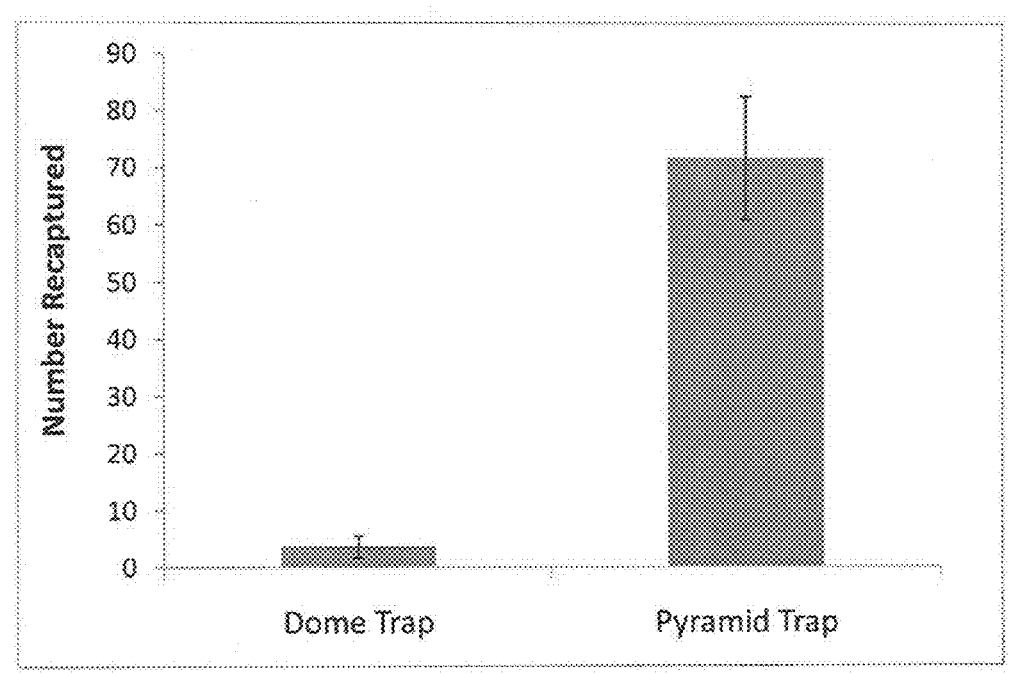
FIG. 9 shows competitive trapping between the standard dome trap and the new pyramid trap of the current invention, the two traps were baited with the same odor cues. Three hundred individuals were released and then trapping occurred over a 24 hour period (n=6).

In the fourth series of experiments an industry standard dome-type trap was compared with the pyramidal trap of the current invention. Both traps were baited with the same odor cues. Three hundred individuals were released and then trapping occurred over a 24 hour period. The results of the fourth experimental series are shown in FIG. 9.

Experimental Results

Experimental results are as follows:
1. The results of the first lab experimental series indicate that red flour beetles are most attracted to LEDs emitting light in the near UV range (390 nm), relative to a selection of LEDs emitting light in other exemplary segments of the light spectrum (see FIGS. 5 and 6).
2. The results of the second series of experiments indicate that LEDs emitting light in the 390 nm wavelength are more effective when placed at the top of a trap rather than at the bottom of the trap. Traps with LEDs positioned at the top of the trap also preformed much better than a control with no LEDs (see FIG. 7).
3. The third series of experiments indicate that the LEDs are most effective when used in combination with a chemical attractant (see FIG. 8).
4. The fourth series of experiments indicate that the trap of the current invention is substantially more effective than the industry standard dome-type trap (see FIG. 9).

For the foregoing reasons, it is clear that the current invention provides an innovative insect trapping system that is most effective with a chemical lure in combination with an LED array. The invention may be modified in multiple ways and applied in various technological applications. For example, although the data collected is targeted to flour beetles, similar methodologies can be applied to other arthropods such as fleas, tics, or bed bugs, or any type of living organism susceptible to the structural and chemical features of the trap.

The current invention may be modified and customized as required by a specific operation or application, and the individual components may be modified and defined, as required, to achieve the desired result. For example, although the trap of the current invention has a general tetrahedral shape, in alternative embodiments, the base and/or cover of the trap may have any shape known in the art consistent with the function of the trap as described herein. Similarly, although the multiple fins of the current trap are disposed on the edges of the trap's sides, in alternative embodiments there may be as few as one individual fin, and the fin(s) may project from any part of the sides of the trap.

Although most of the materials of construction are not described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. An arthropod trap comprising:
    at least one ramp angling upwardly, the ramp having a plurality of sides;
    at least one fin angling upwardly on at least one of the sides of the ramp;
    a capture area disposed adjacent an uppermost portion of the ramp and the at least one fin;
    a cover positioned over the at least one ramp so that the cover abuts and is supported by the at least one fin and at least partially conceals the capture area; and
    at least one light positioned on the cover, the at least one light emitting a light wavelength that elicits a positive phototaxis response in the target arthropod; and
    wherein the trap is structured so that a target arthropod follows the at least one fin up one of the at least one sides and into the capture area, the at least one fin having a longitudinal axis that extends along the at least one respective side so that the at least one fin extends in a plane that is transverse to a plane of the at least one respective side.

2. An arthropod trap comprising:
    a capture area;
    a base having a plurality of sides, at least one of the sides being angled upwardly toward the capture area;
    at least one outwardly projecting fin disposed on the sides, the at least one fin angling up one of the sides toward the capture area so that a target arthropod follows the at least one fin up one of the sides and into the capture area;
    a cover positioned over the base so that the cover abuts and is supported by the at least one fin and at least partially conceals the capture area; and at least one light positioned on the cover, the at least one light emitting a light wavelength that elicits a positive phototaxis response in the target arthropod; and wherein the at least one fin has a longitudinal axis that extends along the one of the sides so that the at least one fin extends in a plane that is transverse to a plane of the one of the sides.

3. The arthropod trap of claim 2 wherein a separation space between the cover and at least one of the sides defines a gap, the gap being an approximate height of a target arthropod.

4. The arthropod trap of claim 2 wherein the light is a light emitting diode.

5. The arthropod trap of claim 4 wherein the target arthropod is a flour beetle and the light emits light at a 390 nm wave length.

6. The arthropod trap of claim 2 wherein the capture area comprises an opening so that the arthropods pass through the opening and are retained.

7. The arthropod trap of claim 2 wherein the target arthropod is a flour beetle.

8. The arthropod trap of claim 2 wherein the base is a hollow tetrahedron having a truncated apex, a location of the capture area corresponding with the truncated apex.

9. The arthropod trap of claim 2 further comprising an attractant.

10. The arthropod trap of claim 9 wherein the attractant is positioned in the capture area so that the attractant draws the target arthropod into the capture area.

11. The arthropod trap of claim 10 wherein the attractant is a pheromone lure.

* * * * *